US011908437B1

(12) United States Patent
Adetoye

(10) Patent No.: US 11,908,437 B1
(45) Date of Patent: Feb. 20, 2024

(54) STRINGED INSTRUMENT-PLAYING MACHINE

(71) Applicant: Olayinka Adetoye, Laurel, MD (US)

(72) Inventor: Olayinka Adetoye, Laurel, MD (US)

( * ) Notice: Subject to any disclaimer, the term of this patent is extended or adjusted under 35 U.S.C. 154(b) by 157 days.

(21) Appl. No.: 17/666,707

(22) Filed: Feb. 8, 2022

(51) Int. Cl.
*G10F 1/20* (2006.01)

(52) U.S. Cl.
CPC .................................... *G10F 1/20* (2013.01)

(58) Field of Classification Search
None
See application file for complete search history.

(56) References Cited

U.S. PATENT DOCUMENTS

| | | | | | |
|---|---|---|---|---|---|
| 6,166,307 | A * | 12/2000 | Caulkins | G10D 3/00 84/50 |
| 6,723,904 | B1 | 4/2004 | Dolan | |
| 7,285,709 | B2 | 10/2007 | White | |
| 7,285,716 | B2 | 10/2007 | Gilmore | |
| 8,546,672 | B1 | 10/2013 | Pinzone | |
| 2014/0165814 | A1 | 6/2014 | Vignolo | |

FOREIGN PATENT DOCUMENTS

| | | | |
|---|---|---|---|
| CN | 112133262 A * | 12/2020 | G10D 1/04 |
| WO | 2011013000 | 2/2011 | |

* cited by examiner

*Primary Examiner* — Kimberly R Lockett
(74) *Attorney, Agent, or Firm* — Kyle A. Fletcher, Esq.

(57) ABSTRACT

The stringed instrument-playing machine is an electromechanical device. The stringed instrument-playing machine is a musical instrument. The stringed instrument-playing machine is an automated structure. The stringed instrument-playing machine automatically announces the musical notes of a song. The stringed instrument-playing machine comprises a stringed instrument and a playing device. The stringed instrument-playing machine incorporates a stringed instrument and a playing device. The stringed instrument is a mechanical structure that generates audible sounds in the form of a plurality of notes. The playing device is an electromechanical device. The playing device is an electrically powered device. The playing device mechanically plays the stringed instrument. By playing the stringed instrument is meant that the playing device determines and causes the stringed instrument to generate: a) the notes that are played; b) the order that the notes are played; and, c) the length of time each note is played.

18 Claims, 6 Drawing Sheets

STRINGED INSTRUMENT-PLAYING MACHINE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

FIELD OF THE INVENTION

The present invention relates to the field of an instrument in which the tones are generated an electromechanical resonance generator for a musical instrument. (G10H3/18)

SUMMARY OF INVENTION

The stringed instrument-playing machine is an electromechanical device. The stringed instrument-playing machine is a musical instrument. The stringed instrument-playing machine is an automated structure. The stringed instrument-playing machine automatically announces the musical notes of a song. The stringed instrument-playing machine comprises a stringed instrument and a playing device. The stringed instrument-playing machine incorporates a stringed instrument and a playing device. The stringed instrument is a mechanical structure that generates audible sounds in the form of a plurality of notes. The playing device is an electromechanical device. The playing device is an electrically powered device. The playing device mechanically plays the stringed instrument. By playing the stringed instrument is meant that the playing device determines and causes the stringed instrument to generate: a) the notes that are played; b) the order that the notes are played; and, c) the length of time each note is played.

These together with additional objects, features and advantages of the stringed instrument-playing machine will be readily apparent to those of ordinary skill in the art upon reading the following detailed description of the presently preferred, but nonetheless illustrative, embodiments when taken in conjunction with the accompanying drawings.

In this respect, before explaining the current embodiments of the stringed instrument-playing machine in detail, it is to be understood that the stringed instrument-playing machine is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the stringed instrument-playing machine.

It is therefore important that the claims be regarded as including such equivalent construction insofar as they do not depart from the spirit and scope of the stringed instrument-playing machine. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word “exemplary” or “illustrative” means “serving as an example, instance, or illustration.” Any implementation described herein as “exemplary” or “illustrative” is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
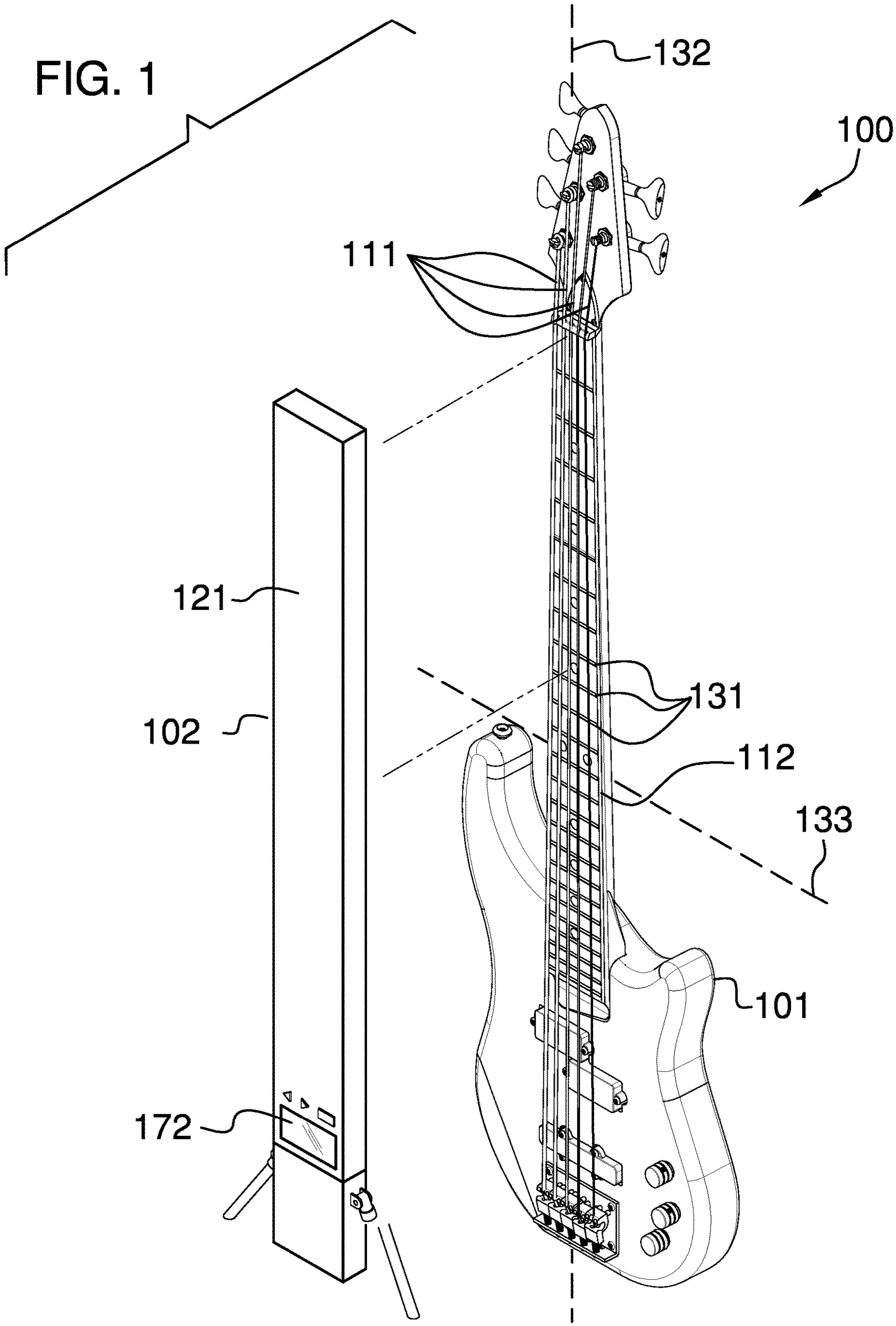
FIG. 1 is a perspective view of an embodiment of the disclosure.
Figure 2:
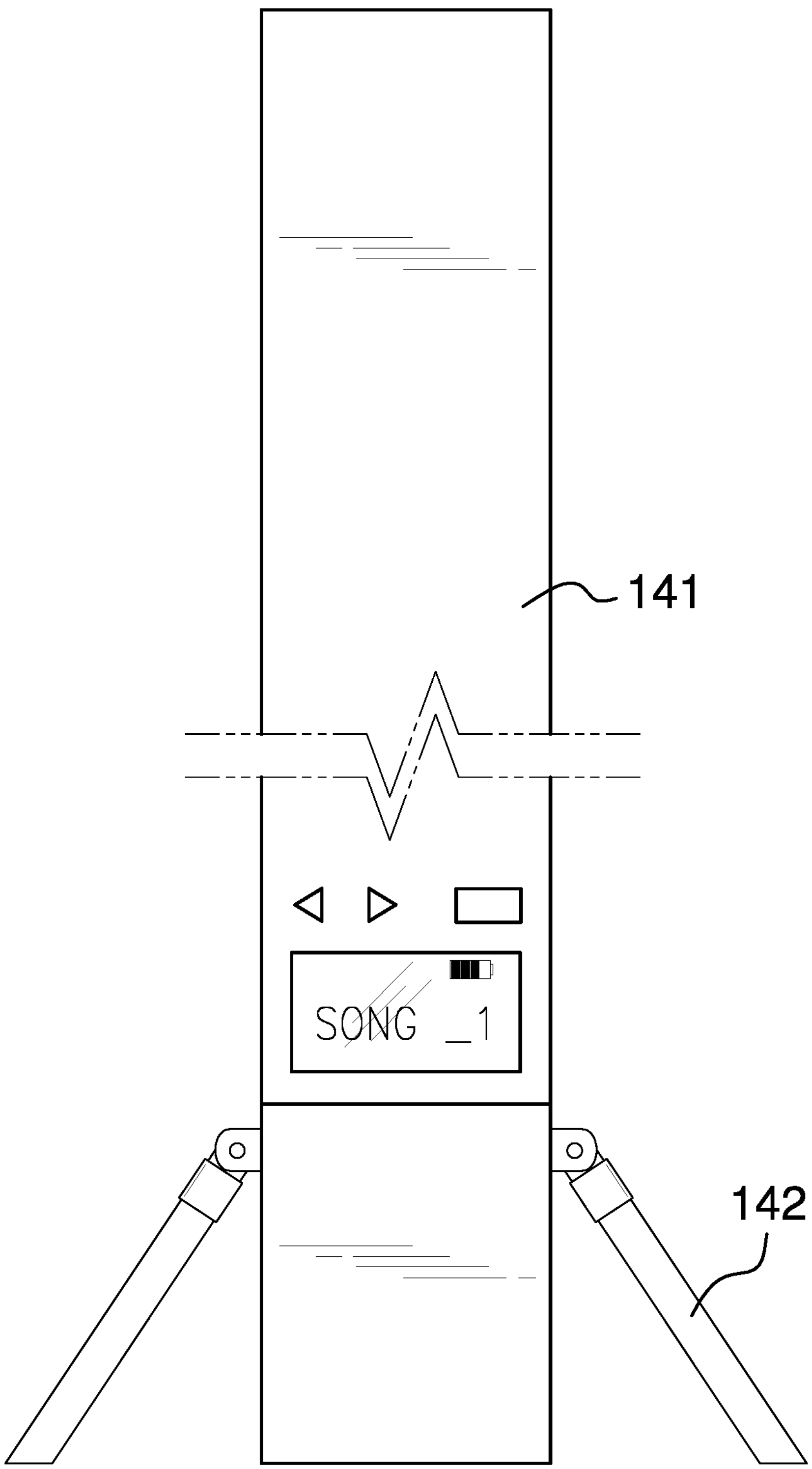
FIG. 2 is a front view of an embodiment of the disclosure.
Figure 3:
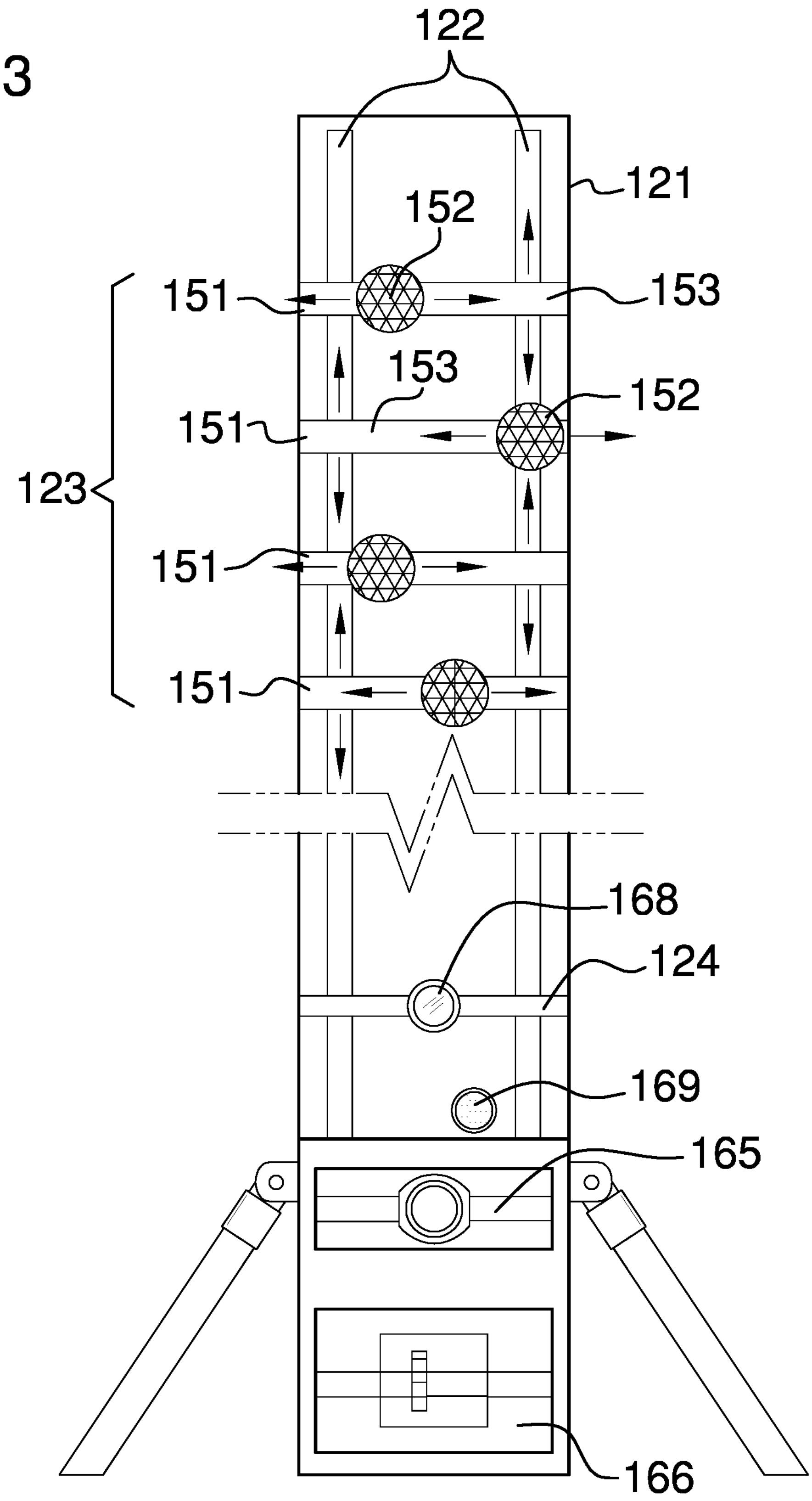
FIG. 3 is a rear view of an embodiment of the disclosure.
Figure 4:
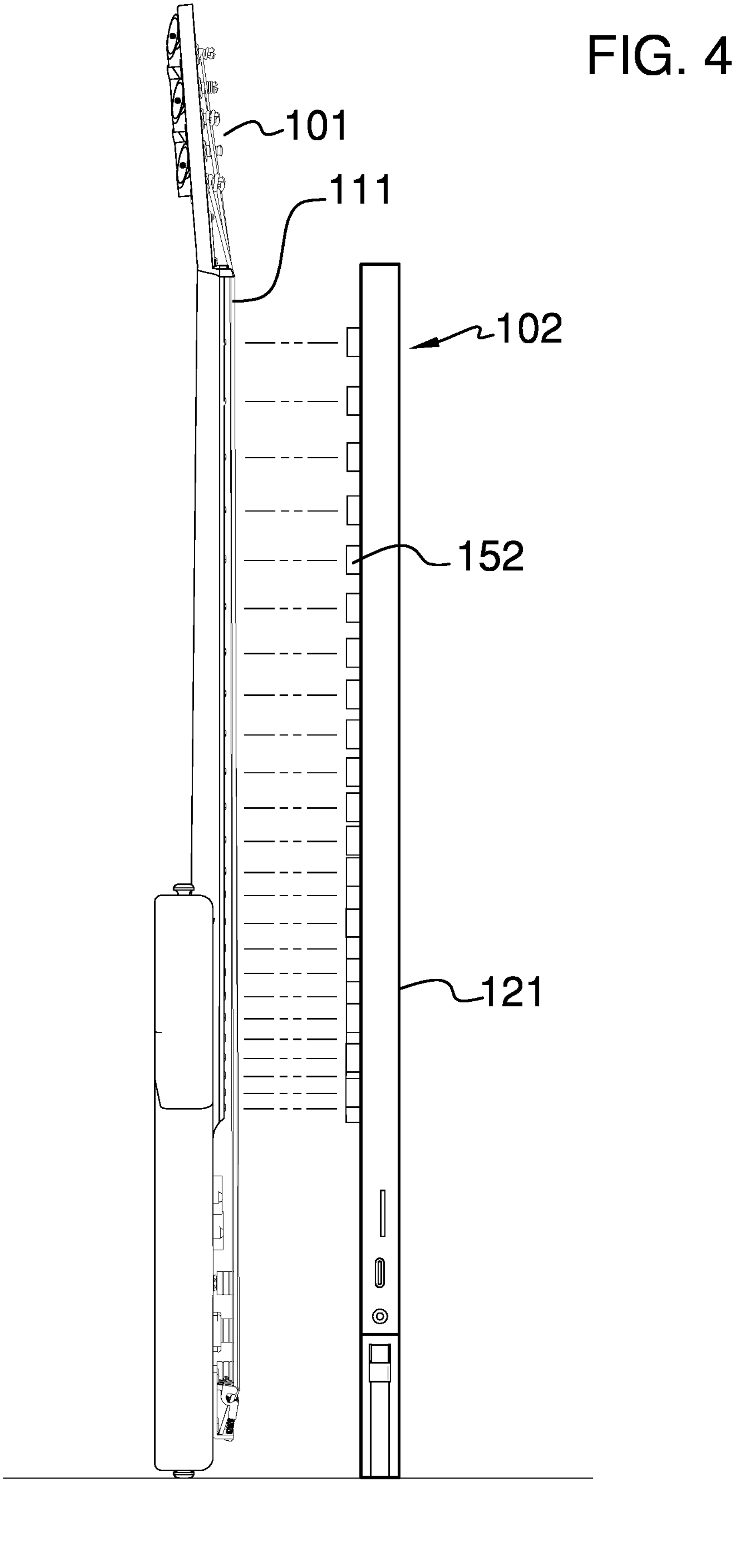
FIG. 4 is a side view of an embodiment of the disclosure.
Figure 5:
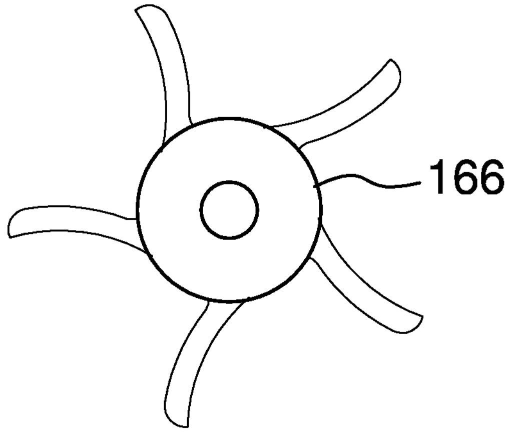
FIG. 5 is a detail view of an embodiment of the disclosure.

Detailed reference will now be made to one or more potential embodiments of the disclosure, which are illustrated in FIGS. 1 through 5.

The stringed instrument-playing machine 100 (hereinafter invention) is an electromechanical device. The invention 100 is a musical instrument. The invention 100 is an automated structure. The invention 100 automatically announces the musical notes of a song. The invention 100 comprises a stringed instrument 101 and a playing device 102. The stringed instrument 101 is a mechanical structure that generates audible sounds in the form of a plurality of notes. The playing device 102 is an electromechanical device. The playing device 102 is an electrically powered device. The playing device 102 mechanically plays the stringed instrument 101. By playing the stringed instrument 101 is meant that the playing device 102 determines and causes the stringed instrument 101 to generate: a) the notes that are played; b) the order that the notes are played; and, c) the length of time each note is played.

The stringed instrument 101 is a musical instrument. The stringed instrument 101 is defined elsewhere in this disclosure. The stringed instrument 101 generates and announces a plurality of notes. The stringed instrument 101 inserts into the playing device 102 such that the playing device 102 will play the stringed instrument 101. By playing the stringed instrument 101 is meant that the playing device 102 determines and causes the stringed instrument 101 to generate: a) the notes that are played; b) the order that the notes are played; and, c) the length of time each note is played. The stringed instrument 101 comprises a plurality of strings 111 and a fretboard 112.

Each of the plurality of strings 111 is a cord that is attached to the stringed instrument 101. Each of the plurality of strings 111 is maintained under tension by the stringed instrument 101. The tension on each of the plurality of strings 111 is selected such that each of the plurality of strings 111 vibrates at a previously determined frequency. The number of strings contained in the plurality of strings 111 varies based on the type of stringed instrument 101 being played by the playing device 102. This disclosure assumes that the plurality of strings 111 contains N individual strings where N is a positive integer number.

The fretboard 112 is a finger board. The fretboard 112 is positioned beneath the plurality of strings 111. The fretboard 112 forms a roughly Euclidean planar surface.

The fretboard 112 is used to change the frequency of vibration of any string selected from the plurality of strings 111. The frequency of vibration of any string selected from the plurality of strings 111 is changed by pressing the selected string against the fretboard 112. The new frequency of the selected string is adjustable. The new frequency of the selected string adjusts by changing the position on the fretboard 112 that the selected string is pressed against. The fretboard 112 further comprises a plurality of frets 131. Each of the plurality of frets 131 is a raised marking device that is formed in the fretboard 112. Each of the plurality of frets 131 marks a specific position on the fretboard 112. The plurality of frets 131 are used to assist in selecting the frequency of each note played by the plurality of strings 111.

The number of frets contained in the plurality of frets 131 varies based on the stringed instrument 101 being played by the playing device 102. This disclosure assumes that the plurality of frets 131 contains M individual frets where M is a positive integer number.

The fretboard 112 further comprises a major axis 132 and a minor axis 133. The major axis 132 is the direction parallel to the major axis 132 of the fretboard 112. The minor axis 133 is the direction parallel to the minor axis 133 of the fretboard 112. The major axis 132 and the minor axis 133 are defined elsewhere in this disclosure.

The playing device 102 is an electromechanical device. The playing device 102 is an electrically powered device. The playing device 102 is an automated device. The playing device 102 automatically plays the stringed instrument 101. The playing device 102 controls the notes played by the stringed instrument 101 by pressing the each of the strings contained in the plurality of strings 111 against the fretboard 112 of the stringed instrument 101. The playing device 102 comprises a housing 121, a plurality of major axis 132 guide rails 122, a plurality of play pad guide rails 123, a fret finder guide rail 124, and a control circuit 125. The plurality of major axis 132 guide rails 122, the plurality of play pad guide rails 123, the fret finder guide rail 124, and the control circuit 125 mount in the housing 121.

The housing 121 is a rigid structure. The housing 121 contains the plurality of major axis 132 guide rails 122, the plurality of play pad guide rails 123, the fret finder guide rail 124, and the control circuit 125. The plurality of strings 111 and the fretboard 112 of the stringed instrument 101 insert into the housing 121. The housing 121 is formed with all apertures and form factors necessary to allow the housing 121 to accommodate the use and operation of the plurality of major axis 132 guide rails 122, the plurality of play pad guide rails 123, the fret finder guide rail 124, and the control circuit 125. The housing 121 comprises a pan structure 141 and a stand structure 142.

The pan structure 141 is a prism shaped structure. The pan structure 141 is formed with a semi-enclosed pan shape. The pan structure 141 is sized such that the plurality of major axis 132 guide rails 122, the plurality of play pad guide rails 123, the fret finder guide rail 124, the control circuit 125 fit within the pan structure 141. The form factor of the pan structure 141 is structured such that the plurality of strings 111 and the fretboard 112 of the stringed instrument 101 insert into the interior space of the pan structure 141. The plurality of strings 111 and the fretboard 112 of the stringed instrument 101 insert into the pan structure 141 in anticipation of the playing device 102 playing the stringed instrument 101.

The stand structure 142 is a mechanical structure. The stand structure 142 attaches to the exterior surfaces of the pan structure 141. The stand structure 142 is formed such that the stand structure 142 allows the playing device 102 to be a self-standing structure.

Each of the plurality of major axis 132 guide rails 122 is a prism shaped rail that is formed in the housing 121. The center axes of each of the plurality of major axis 132 guide rails 122 are parallel to each other. Each of the plurality of major axis 132 guide rails 122 are parallel to the major axis 132 of the fretboard 112 when the stringed instrument 101 is inserted into the housing 121. Each of the plurality of play pad guide rails 123 attach to the plurality of major axis 132 guide rails 122 such that each of the plurality of play pad guide rails 123 moves relative to the plurality of major axis 132 guide rails 122. The plurality of major axis 132 guide rails 122 forms a track that guides the motion of each of the plurality of play pad guide rails 123 relative to the fretboard 112.

Each of the plurality of play pad guide rails 123 is a prism shaped rail. Each of the plurality of play pad guide rails 123 attaches to the plurality of major axis 132 guide rails 122 such that each of the plurality of play pad guide rails 123 moves relative to the fretboard 112 and the plurality of strings 111 when the stringed instrument 101 inserts into the housing 121. The center axes of each of the plurality of play pad guide rails 123 are parallel to each other. Each of the plurality of play pad guide rails 123 attaches to the plurality of major axis 132 guide rails 122 such that the center axes of each of the plurality of play pad guide rails 123 are perpendicular to the center axes of each of the plurality of major axis 132 guide rails 122. The plurality of play pad guide rails 123 comprises a collection of individual play pad 152 guide rails 151.

Each individual play pad 152 guide rail 151 selected from the plurality of play pad guide rails 123 is a prism shaped rail. Each individual play pad 152 guide rail 151 selected from the plurality of play pad guide rails 123 attaches to the plurality of major axis 132 guide rails 122. Each of the individual play pad 152 guide rails 151 are parallel to each other. Each individual play pad 152 guide rail 151 selected from the plurality of play pad guide rails 123 attaches to the plurality of major axis 132 guide rails 122 such that each individual play pad 152 guide rail 151 moves relative to the plurality of major axis 132 guide rails 122. The individual play pad 152 guide rail 151 further comprises an individual play pad 152 and an individual guide rail 153.

The individual guide rail 153 is a prism shaped rail that mounts in the housing 121. The individual guide rail 153 attaches to the plurality of major axis 132 guide rails 122.

The individual guide rail 153 attaches to the plurality of major axis 132 guide rails 122 such that each individual guide rail 153 moves relative to the plurality of major axis 132 guide rails 122. The individual guide rail 153 attaches to the plurality of major axis 132 guide rails 122 such that the center axis of the individual guide rail 153 is perpendicular to the center axes of the plurality of major axis 132 guide rails 122.

The individual play pad 152 is a disk shaped structure. The individual play pad 152 attaches to the individual guide rail 153 such that the individual play pad 152 moves relative to the individual guide rail 153. The control circuit 125 controls the movement and the position of the individual play pad 152 relative to the individual guide rail 153. The control circuit 125 positions each individual play pad 152 guide rail 151 relative to the plurality of frets 131 on the fretboard 112. The control circuit 125 further positions the individual play pad 152 relative to the individual guide rail 153 such that the individual play pad 152 is positioned over a string selected from the plurality of strings 111. Each individual play pad 152 presses against a string selected from the plurality of strings 111 against the fretboard 112 to change the frequency of the note announced by the selected string. The number of individual play pad 152 guide rails 151 contained in the plurality of play pad guide rails 123 equals the number of strings contained in the plurality of strings 111. Specifically, the plurality of play pad guide rails 123 contains N individual play pads 152.

The fret finder guide rail 124 is a prism shaped rail. The fret finder guide rail 124 attaches to the plurality of major axis 132 guide rails 122 such that the fret finder guide rail 124 moves relative to the fretboard 112 and the plurality of strings 111. The center axis of the fret finder guide rail 124 is perpendicular to the center axes of each of the plurality of major axis 132 guide rails 122.

The control circuit 125 is an electromechanical device. The control circuit 125 is an electrically powered device. The control circuit 125 forms an electric circuit. The control circuit 125 controls the operation of the playing device 102. The control circuit 125 controls the playing device 102 as the playing device 102 plays the stringed instrument 101. The control circuit 125 downloads the music that is to be played by the playing device 102. The control circuit 125 controls the position of each individual play pad 152 guide rail 151 relative to each of the plurality of major axis 132 guide rails 122.

The control circuit 125 controls the position of each individual play pad 152 guide rail 151 relative to the plurality of strings 111 and the fretboard 112. The control circuit 125 provides the motive forces that press each individual play pad 152 of each individual play pad 152 guide rail 151 against a string selected from the plurality of strings 111 such that the selected string is pressed against the fretboard 112. The control circuit 125 controls the timing of when each individual play pad 152 presses against the selected string. The control circuit 125 controls the position of each individual play pad 152 relative to the plurality of strings 111. The control circuit 125 controls the position of each fret finder guide rail 124 relative to the fretboard 112. The control circuit 125 moves the fret finder guide rail 124 to determine the position of each of the plurality of frets 131 on the fretboard 112. The control circuit 125 provides the motive forces required to vibrate each of the plurality of strings 111.

The control circuit 125 comprises a logic module 161, a plurality of fret servo motors 162, a plurality of string servo motors 163, a plurality of pad solenoids 164, a slap piston 165, a pluck module 166, a fret finder servo motor 167, a fret finder image sensor 168, and a microphone 169. The logic module 161, the plurality of fret servo motors 162, the plurality of string servo motors 163, the plurality of pad solenoids 164, the slap piston 165, the pluck module 166, the fret finder servo motor 167, the fret finder image sensor 168, and the microphone 169 are electrically interconnected.

The logic module 161 is an electric circuit. The logic module 161 is a programmable electronic device. The logic module 161 controls the operation of the control circuit 125. The logic module 161 controls the control circuit 125 as the playing device 102 plays the stringed instrument 101. The logic module 161 downloads the music that is to be played by the playing device 102.

The logic module 161 controls the position of each individual play pad 152 guide rail 151 relative to each of the plurality of major axis 132 guide rails 122. The logic module 161 controls the position of each individual play pad 152 guide rail 151 relative to the plurality of strings 111 and the fretboard 112. The logic module 161 controls the motive forces that press each individual play pad 152 of each individual play pad 152 guide rail 151 against a string selected from the plurality of strings 111 such that the selected string is pressed against the fretboard 112. The logic module 161 controls the timing of when each individual play pad 152 presses against the selected string. The logic module 161 controls the position of each individual play pad 152 relative to the plurality of strings 111. The logic module 161 controls the position of each fret finder guide rail 124 relative to the fretboard 112. The logic module 161 controls the motion of the fret finder guide rail 124 to determine the position of each of the plurality of frets 131 on the fretboard 112. The logic module 161 controls the motive forces required to vibrate each of the plurality of strings 111.

The logic module 161 further comprises a memory device 171 and a display 172. The memory device 171 forms a detachable electric connection with the logic module 161. The display 172 electrically connects with the logic module 161.

The memory device 171 is a storage device. The memory device 171 contains the digital information required by the logic module 161 to allow the logic module 161 automatically play a specific song on the stringed instrument 101. In the first potential embodiment of the disclosure, the memory device 171 is an SD card.

The display 172 is an interface device. The display 172 allows the logic module 161 to receive and respond to externally generated instruction. The display 172 further allows the logic module 161 to visibly present data regarding the operation of the logic module 161.

Each of the plurality of fret servo motors 162 is a servo motor. Each of the plurality of fret servo motors 162 attaches to an individual guide rail 153 of an individual play pad 152 guide rail 151 selected from the plurality of play pad guide rails 123. Each of the plurality of fret servo motors 162 electrically connects to the logic module 161. The logic module 161 independently controls each of the plurality of fret servo motors 162. Each fret servo motor selected from the plurality of fret servo motors 162 controls the motion of its associated individual guide rail 153 relative to the plurality of major axis 132 guide rails 122. Each fret servo motor selected from the plurality of fret servo motors 162 provides the motive forces necessary to allow the logic module 161 to properly position each individual play pad 152 guide rail 151 relative to the fretboard 112.

Each of the plurality of string servo motors 163 is a servo motor. Each of the plurality of string servo motors 163 attaches to an individual play pad 152 of an individual play pad 152 guide rail 151 selected from the plurality of play pad guide rails 123. Each of the plurality of string servo motors 163 electrically connects to the logic module 161. The logic module 161 independently controls each of the plurality of string servo motors 163. Each string servo motor selected from the plurality of string servo motors 163 controls the motion of its associated individual play pad 152 relative to the individual guide rail 153. Each string servo motor selected from the plurality of string servo motors 163 provides the motive forces necessary to allow the logic module 161 to properly position each individual play pad 152 relative to the plurality of strings 111.

Each of the plurality of pad solenoids 164 is a solenoid. Each of the plurality of pad solenoids 164 attaches to an individual play pad 152 of an individual play pad 152 guide rail 151 selected from the plurality of play pad guide rails 123. Each of the plurality of pad solenoids 164 electrically connects to the logic module 161. The logic module 161 independently controls each of the plurality of pad solenoids 164. Each pad solenoid selected from the plurality of pad solenoids 164 controls the motion of its associated individual play pad 152 towards and away from a string selected from the plurality of strings 111. Each pad solenoid selected from the plurality of pad solenoids 164 provides the motive forces necessary to allow the logic module 161 to press a string selected from the plurality of strings 111 against the fretboard 112.

The slap piston 165 is an electromechanical device. The slap piston 165 is an electrically powered device. The slap piston 165 electrically connects to the logic module 161. The slap piston 165 independently controls each of the logic module 161. The slap piston 165 provides the motive forces that simultaneously causes each of the plurality of strings 111 to vibrate.

The pluck module 166 is an electromechanical device. The pluck module 166 is an electrically powered device. The pluck module 166 electrically connects to the logic module 161. The pluck module 166 independently controls each of the logic module 161. The pluck module 166 provides the motive forces that independently plucks each individual string selected from the plurality of strings 111. The pluck module 166 allows the control circuit 125 to cause any individual string selected from the plurality of strings 111 to vibrate.

The fret finder servo motor 167 is a servo motor. The fret finder servo motor 167 attaches to the fret finder guide rail 124. The fret finder servo motor 167 electrically connects to the logic module 161. The logic module 161 independently controls each of the fret finder servo motor 167. The fret finder servo motor 167 controls the motion the fret finder guide rail 124 relative to the plurality of major axis 132 guide rails 122. The fret finder servo motor 167 moves the fret finder image sensor 168 mounted on the fret finder guide rail 124 such that the logic module 161 can identify the location of each of the plurality of frets 131.

The fret finder image sensor 168 is an image sensor. The fret finder image sensor 168 mounts on the fret finder guide rail 124 such that the fret finder image sensor 168 captures images of the fretboard 112 as the fret finder guide rail 124 moves relative to the plurality of major axis 132 guide rails 122. The fret finder image sensor 168 electrically connects to the logic module 161. The logic module 161 monitors the fret finder image sensor 168 such that the logic module 161 can identify the location of each of the plurality of frets 131 of the fretboard 112.

The microphone 169 is a transducer. The microphone 169 converts acoustic energy into an electric signal. The microphone 169 electrically connects to the logic module 161. The logic module 161 monitors the microphone 169. The logic module 161 analyzes the electric signal received from the microphone 169 to ensure that the plurality of strings 111 of the stringed instrument 101 remain in tune.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Announce: As used in this disclosure, to announce means to generate one or more notes from a musical instrument. The term to play is a synonym for to announce.

Automatic: As used in this disclosure, automatic refers to a device, process, or a system that operates without human control, supervision, or participation in the operation of the device, process, or system. The verb form of automatic is to automate.

Bass Guitar: As used in this disclosure, the base guitar is a stringed musical instrument generally having a flat backed body, a neck and four strings that are played by plucking with the fingers or a pick. The bass guitar is tuned the same as a double bass instrument and can have a fretted fingerboard or an unfretted fingerboard. A bass guitar is usually electrically amplified but can be acoustically amplified. This definition is intended to match the common usage of the term.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Cord: As used in this disclosure, a cord is a long, thin, flexible, and prism shaped string, line, rope, or wire. Cords are made from yarns, piles, or strands of material that are braided or twisted together or from a monofilament (such as fishing line). Cords have tensile strength but are too flexible to provide compressive strength and are not suitable for use in pushing objects. String, line, cable, yarn, and rope are synonyms for cord.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Electric Motor: In this disclosure, an electric motor is a machine that converts electric energy into rotational mechanical energy. An electric motor typically comprises a stator and a rotor. The stator is a stationary hollow cylindrical structure that forms a magnetic field. The rotor is a magnetically active rotating cylindrical structure that is coaxially mounted in the stator. The magnetic interactions between the rotor and the stator physically causes the rotor to rotate within the stator thereby generating rotational mechanical energy. This disclosure assumes that the power source is an externally provided source of DC electrical power. The use of DC power is not critical and AC power can be used by exchanging the DC electric motor with an AC motor that has a reversible starter winding.

Euclidean Surface: As used in this disclosure, a Euclidean surface refers to a two-dimensional plane that is formed without a curvature. By without a curvature is meant that the shortest distance between any two points on a Euclidean surface forms a line that remains on the Euclidean surface.

Exterior: As used in this disclosure, the exterior is used as a relational term that implies that an object is not contained within the boundary of a structure or a space.

Feedback: As used in this disclosure, feedback refers to a system, including engineered systems, or a subsystem further comprising an "input" and an "output" wherein the difference between the output of the engineered system or subsystem and a reference is used as, or fed back into, a portion of the input of the system or subsystem. Examples of feedback in engineered systems include, but are not limited to, a fluid level control device such as those typically used in a toilet tank, a cruise control in an automobile, a fly ball governor, a thermostat, and almost any electronic device that comprises an amplifier. Feedback systems in nature include, but are not limited to, thermal regulation in animals and blood clotting in animals (wherein the platelets involved in blood clotting release chemical to attract other platelets).

Form Factor: As used in this disclosure, the term form factor refers to the size and shape of an object.

Fingerboard: As used in this disclosure, a fingerboard is a strip of material that is attached to the neck of a stringed instrument. The strings of the instrument run over the fingerboard. To play the instrument, the musician presses the string against the fingerboard to change the vibration length of the string which changes the pitch produced by the instrument. In this disclosure, fingerboard and fretboard can be used interchangeably.

Fret: As used in this disclosure, a fret is a raised element on the neck of a fingerboard that divides the neck into fixed segments or intervals.

Fretboard: As used in this disclosure, a fretboard is a fingerboard with frets inserted. In this disclosure, fingerboard and fretboard can be used interchangeably.

Guitar: As used in this disclosure, a guitar is a traditional guitar or a bass guitar.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Housing: As used in this disclosure, a housing is a rigid structure that encloses and protects one or more devices.

Image Sensor: As used in this disclosure, an image sensor detects electromagnetic light from the exterior of the image sensor and converts the detected electromagnetic radiation into a digital representation of sufficient detail to allow a logic module to create and display a visual reproduction of the source of the captured electromagnetic radiation.

Independent: As used in this disclosure, the term independent refers to the relationship between the operation and control of a first device and a second device. The first device and the second device are independent from each other if: a) the operation of the first device is neither impacted nor influenced by the operation of the second device; and, b) the operation of the second device is neither impacted nor influenced by the operation of the first device.

Interior: As used in this disclosure, the interior is used as a relational term that implies that an object is contained within the boundary of a structure or a space.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs. The disclosure allows, but does not assume, that the logic module is programmable.

Major and Minor Axes: As used in this disclosure, the major and minor axes refer to a pair of perpendicular axes that are defined within a structure. The length of the major axis is always greater than or equal to the length of the minor axis. The major axis is always the longest diameter of the structure. The major and minor axes intersect at the center of the structure. The major axis is always parallel to the longest edge of a rectangular structure.

Memory Device: As used in this device, a memory device is an electronic device that stores information (including audio and video data) in a digital format. Common memory devices include the RAM (random access memory) and disk drives in a computer, USB (Universal Serial Bus) drives, DVD (Digital Video Disk) formatted video, and SD (secure digital) cards.

Microphone: As used in this disclosure, a microphone is a transducer that converts the energy from vibration into electrical energy. The sources of vibrations include, but are not limited to, acoustic energy.

Motor: As used in this disclosure, a motor refers to the method of transferring energy from an external power source into rotational mechanical energy.

Neck: As used in this disclosure, a neck is a part of certain string instruments that projects from the main body and provides the base for the fingerboard.

Negative Space: As used in this disclosure, negative space is a method of defining an object through the use of open or empty space as the definition of the object itself, or, through the use of open or empty space to describe the boundaries of an object.

Non-Euclidean Plane: As used in this disclosure, a non-Euclidean plane (or non-Euclidean surface) is a geometric plane that is formed with a curvature such that: a) two parallel lines will intersect somewhere in the planar surface; or, b) the span of the perpendicular distance between two parallel lines will vary as a function of the position of the plane; or, c) the minimum distance between two points on the non-Euclidean plane as measured along the non-Euclidean plane is greater than the absolute minimum distance between the same two points. In many geometries, the statements (a) and (b) can be considered identical statements. A non-Euclidean plane is said to form a roughly Euclidean surface (or plane) when the span of the minimum distance between two points on the non-Euclidean plane as measured along the non-Euclidean plane is less than or equal to 1.1 times the absolute minimum distance between the same two points.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

Note: As used in this disclosure, a note refers to a specific frequency of an audible sound. The note referred to as A4 (also known as middle A) has a frequency of 440 Hz.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Perimeter: As used in this disclosure, a perimeter is one or more curved or straight lines that bounds an enclosed area on a plane or surface. The perimeter of a circle is commonly referred to as a circumference.

Pluck: As used in this disclosure, to pluck means to rapidly move an object from its original position. Pluck is often used in reference to initiating the vibration of strings in a stringed musical instrument.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Rail: As used in this disclosure, a rail is a continuous physical structure is used to guide the motion of an object along a track. The rail often attaches the object to the track.

Roughly: As used in this disclosure, roughly refers to a comparison between two objects. Roughly means that the difference between one or more parameters of the two compared objects are not significantly different.

Self-Standing: As used in this disclosure, self-standing refers to a mechanical structure that: a) remains stable on a supporting surface; without, b) requiring the transfer of a portion of the load of the mechanical structure to load paths provided by structures that are independent of the mechanical structure.

Servo Motor: As used in this disclosure, a servo motor is an electrical motor that further incorporates a feedback circuit that allows for the precise angular positioning of the electric motor.

Stringed Instrument: As used in this disclosure, a stringed instrument is a musical instrument. The stringed instrument announces one or more notes that are generated by the vibration of a cord that is commonly called a string.

Track: As used in this disclosure, a track is a device that is used to control the path of motion of an object.

Traditional Guitar: As used in this disclosure, a traditional guitar is a stringed musical instrument generally having a flat back, a neck, a fretted fingerboard, and either 6 or 12 strings that are played by strumming or plucking with the fingers or a pick. A traditional guitar can be acoustically or electrically amplified. This definition is intended to match the common usage of the term. A traditional guitar is often referred to as a guitar.

Transducer: As used in this disclosure, a transducer is a device that converts a physical quantity, such as pressure or brightness into an electrical signal or a device that converts an electrical signal into a physical quantity.

Figure 6:
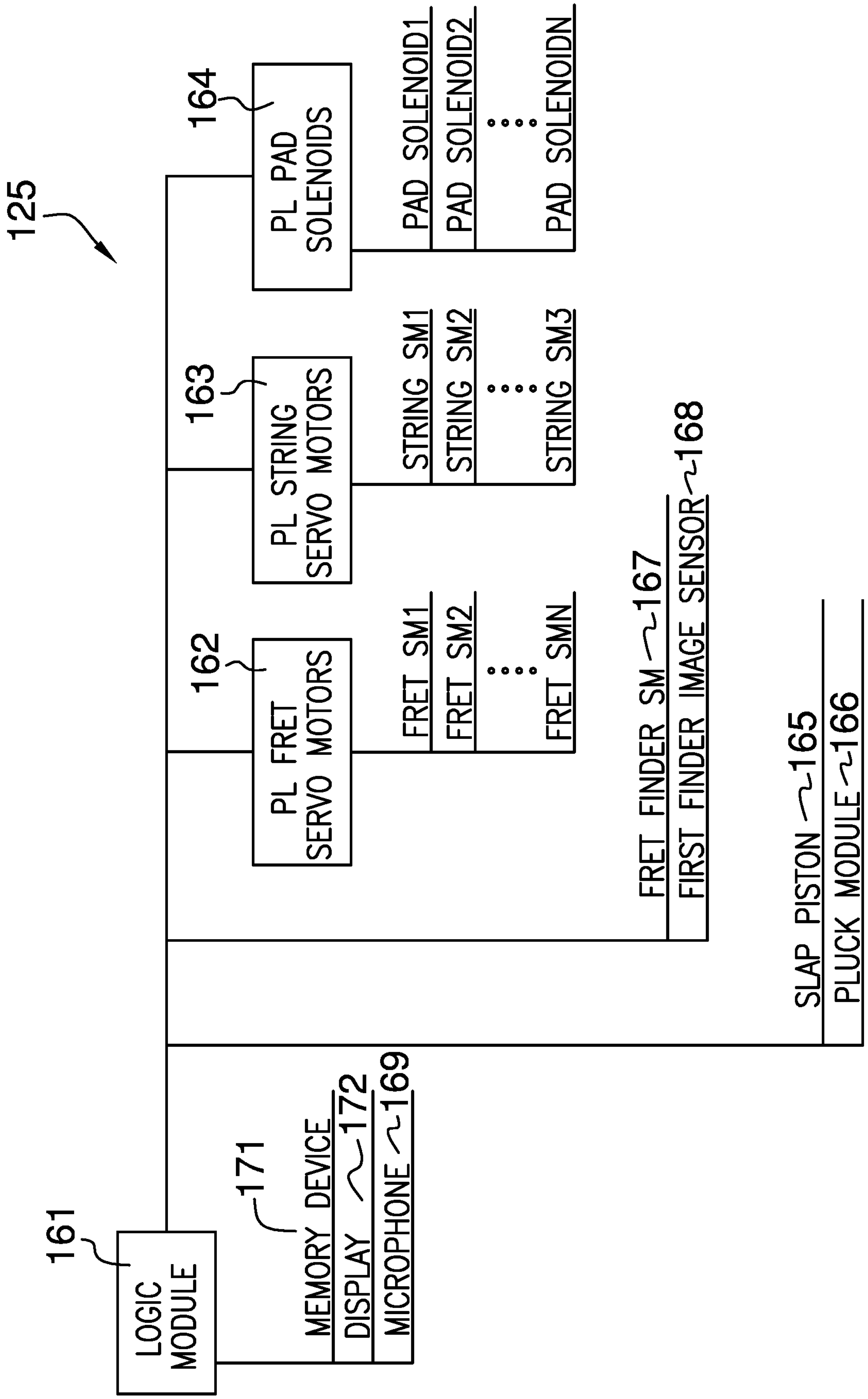
FIG. 6 is a schematic view of an embodiment of the disclosure.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A music-playing machine comprising
wherein the music-playing machine comprises a stringed instrument and a playing device;
wherein the stringed instrument is a mechanical structure that generates audible;
wherein the playing device mechanically plays the stringed instrument;
wherein the playing device is an electromechanical device;
wherein the playing device is an electrically powered device;
wherein by playing the stringed instrument is meant that the playing device determines and causes the stringed instrument to generate: a) the notes that are played; b) the order that the notes are played; and, c) the length of time each note is played;
wherein the stringed instrument generates and announces a plurality of notes;
wherein the stringed instrument inserts into the playing device such that the playing device will play the stringed instrument.

2. The music-playing machine according to claim 1
wherein the music-playing machine is an electromechanical device;
wherein the music-playing machine is a musical instrument;
wherein the music-playing machine is an automated structure;
wherein the music-playing machine automatically announces a plurality of musical notes.

3. The music-playing machine according to claim 2
wherein the stringed instrument comprises a plurality of strings and a fretboard;
wherein each of the plurality of strings is a cord that is attached to the stringed instrument;
wherein each of the plurality of strings is maintained under tension by the stringed instrument;
wherein the tension on each of the plurality of strings is selected such that each of the plurality of strings vibrates at a previously determined frequency;
wherein the number of strings contained in the plurality of strings varies based on the type of stringed instrument being played by the playing device;
wherein the fretboard is a finger board;
wherein the fretboard is positioned beneath the plurality of strings;
wherein the fretboard forms a roughly Euclidean planar surface;
wherein the fretboard is used to change the frequency of vibration of any string selected from the plurality of strings;
wherein the frequency of vibration of any string selected from the plurality of strings is changed by pressing the selected string against the fretboard;
wherein the new frequency of the selected string is adjustable;
wherein the new frequency of the selected string adjusts by changing the position on the fretboard that the selected string is pressed against.

4. The music-playing machine according to claim 3
wherein the fretboard further comprises a plurality of frets;
wherein each of the plurality of frets is a raised marking device that is formed in the fretboard;
wherein each of the plurality of frets marks a specific position on the fretboard;
wherein the plurality of frets are used to assist in selecting the frequency of each note played by the plurality of strings;
wherein the number of frets contained in the plurality of frets varies based on the stringed instrument being played by the playing device;
wherein the fretboard further comprises a major axis and a minor axis;
wherein the major axis is the direction parallel to the major axis of the fretboard;
wherein the minor axis is the direction parallel to the minor axis of the fretboard.

5. The music-playing machine according to claim 4
wherein the playing device is an electromechanical device;
wherein the playing device is an electrically powered device;
wherein the playing device is an automated device;
wherein the playing device automatically plays the stringed instrument;
wherein the playing device controls the notes played by the stringed instrument by pressing the each of the strings contained in the plurality of strings against the fretboard of the stringed instrument.

6. The music-playing machine according to claim 5
wherein the playing device comprises a housing, a plurality of major axis guide rails, a plurality of play pad guide rails, a fret finder guide rail, and a control circuit;
wherein the plurality of major axis guide rails, the plurality of play pad guide rails, the fret finder guide rail, and the control circuit mount in the housing.

7. The music-playing machine according to claim 6
wherein the housing is a rigid structure;
wherein the housing contains the plurality of major axis guide rails, the plurality of play pad guide rails, the fret finder guide rail, and the control circuit;
wherein the plurality of strings and the fretboard of the stringed instrument insert into the housing.

8. The music-playing machine according to claim 7
wherein each of the plurality of major axis guide rails is a rail that is formed in the housing;
wherein the center axes of each of the plurality of major axis guide rails are parallel to each other;
wherein each of the plurality of major axis guide rails are parallel to the major axis of the fretboard when the stringed instrument is inserted into the housing;
wherein each of the plurality of play pad guide rails attach to the plurality of major axis guide rails such that each of the plurality of play pad guide rails moves relative to the plurality of major axis guide rails;
wherein the plurality of major axis guide rails forms a track that guides the motion of each of the plurality of play pad guide rails relative to the fretboard.

9. The music-playing machine according to claim 8
wherein each of the plurality of play pad guide rails is a rail;

wherein each of the plurality of play pad guide rails attaches to the plurality of major axis guide rails such that each of the plurality of play pad guide rails moves relative to the fretboard and the plurality of strings when the stringed instrument inserts into the housing;

wherein the center axes of each of the plurality of play pad guide rails are parallel to each other;

wherein each of the plurality of play pad guide rails attaches to the plurality of major axis guide rails such that the center axes of each of the plurality of play pad guide rails are perpendicular to the center axes of each of the plurality of major axis guide rails.

10. The music-playing machine according to claim 9 wherein the plurality of play pad guide rails comprises a collection of individual play pad guide rails;

wherein each individual play pad guide rail selected from the plurality of play pad guide rails is a rail;

wherein each individual play pad guide rail selected from the plurality of play pad guide rails attaches to the plurality of major axis guide rails;

wherein each of the individual play pad guide rails are parallel to each other;

wherein each individual play pad guide rail selected from the plurality of play pad guide rails attaches to the plurality of major axis guide rails such that each individual play pad guide rail moves relative to the plurality of major axis guide rails.

11. The music-playing machine according to claim 10 wherein the individual play pad guide rail further comprises an individual play pad and an individual guide rail;

wherein the individual guide rail is a prism shaped rail that mounts in the housing;

wherein the individual guide rail attaches to the plurality of major axis guide rails;

wherein the individual guide rail attaches to the plurality of major axis guide rails such that each individual guide rail moves relative to the plurality of major axis guide rails;

wherein the individual guide rail attaches to the plurality of major axis guide rails such that the center axis of the individual guide rail is perpendicular to the center axes of the plurality of major axis guide rails;

wherein the individual play pad is a disk shaped structure;

wherein the individual play pad attaches to the individual guide rail such that the individual play pad moves relative to the individual guide rail;

wherein the control circuit controls the movement and the position of the individual play pad relative to the individual guide rail;

wherein the control circuit positions each individual play pad guide rail relative to the plurality of frets on the fretboard;

wherein the control circuit further positions the individual play pad relative to the individual guide rail such that the individual play pad is positioned over a string selected from the plurality of strings;

wherein each individual play pad presses against a string selected from the plurality of strings against the fretboard to change the frequency of the note announced by the selected string;

wherein the number of individual play pad guide rails contained in the plurality of play pad guide rails equals the number of strings contained in the plurality of strings.

12. The music-playing machine according to claim 11 wherein the fret finder guide rail is a prism shaped rail;

wherein the fret finder guide rail attaches to the plurality of major axis guide rails such that the fret finder guide rail moves relative to the fretboard and the plurality of strings;

wherein the center axis of the fret finder guide rail is perpendicular to the center axes of each of the plurality of major axis guide rails.

13. The music-playing machine according to claim 12 wherein the control circuit is an electromechanical device;

wherein the control circuit is an electrically powered device;

wherein the control circuit forms an electric circuit;

wherein the control circuit controls the operation of the playing device;

wherein the control circuit controls the playing device as the playing device plays the stringed instrument;

wherein the control circuit downloads the music that is to be played by the playing device;

wherein the control circuit controls the position of each individual play pad guide rail relative to each of the plurality of major axis guide rails;

wherein the control circuit controls the position of each individual play pad guide rail relative to the plurality of strings and the fretboard;

wherein the control circuit provides the motive forces that press each individual play pad of each individual play pad guide rail against a string selected from the plurality of strings such that the selected string is pressed against the fretboard;

wherein the control circuit controls the timing of when each individual play pad presses against the selected string;

wherein the control circuit controls the position of each individual play pad relative to the plurality of strings;

wherein the control circuit controls the position of each fret finder guide rail relative to the fretboard;

wherein the control circuit moves the fret finder guide rail to determine the position of each of the plurality of frets on the fretboard;

wherein the control circuit provides the motive forces required to vibrate each of the plurality of strings.

14. The music-playing machine according to claim 13 wherein the control circuit comprises a logic module, a plurality of fret servo motors, a plurality of string servo motors, a plurality of pad solenoids, a slap piston, a pluck module, a fret finder servo motor, a fret finder image sensor, and a microphone;

wherein the logic module, the plurality of fret servo motors, the plurality of string servo motors, the plurality of pad solenoids, the slap piston, the pluck module, the fret finder servo motor, the fret finder image sensor, and the microphone are electrically interconnected.

15. The music-playing machine according to claim 14 wherein the logic module is an electric circuit;

wherein the logic module is a programmable electronic device;

wherein the logic module controls the operation of the control circuit;

wherein the logic module controls the control circuit as the playing device plays the stringed instrument;

wherein the logic module downloads the music that is to be played by the playing device;

wherein the logic module controls the position of each individual play pad guide rail relative to each of the plurality of major axis guide rails;

wherein the logic module controls the position of each individual play pad guide rail relative to the plurality of strings and the fretboard;

wherein the logic module controls the motive forces that press each individual play pad of each individual play pad guide rail against a string selected from the plurality of strings such that the selected string is pressed against the fretboard;

wherein the logic module controls the timing of when each individual play pad presses against the selected string;

wherein the logic module controls the position of each individual play pad relative to the plurality of strings;

wherein the logic module controls the position of each fret finder guide rail relative to the fretboard;

wherein the logic module controls the motion of the fret finder guide rail to determine the position of each of the plurality of frets on the fretboard;

wherein the logic module controls the motive forces required to vibrate each of the plurality of strings.

16. The music-playing machine according to claim 15 wherein each of the plurality of fret servo motors is a servo motor;

wherein each of the plurality of fret servo motors attaches to an individual guide rail of an individual play pad guide rail selected from the plurality of play pad guide rails;

wherein each of the plurality of fret servo motors electrically connects to the logic module;

wherein the logic module independently controls each of the plurality of fret servo motors;

wherein each fret servo motor selected from the plurality of fret servo motors controls the motion of its associated individual guide rail relative to the plurality of major axis guide rails;

wherein each fret servo motor selected from the plurality of fret servo motors provides the motive forces necessary to allow the logic module to properly position each individual play pad guide rail relative to the fretboard;

wherein each of the plurality of string servo motors is a servo motor;

wherein each of the plurality of string servo motors attaches to an individual play pad of an individual play pad guide rail selected from the plurality of play pad guide rails;

wherein each of the plurality of string servo motors electrically connects to the logic module;

wherein the logic module independently controls each of the plurality of string servo motors;

wherein each string servo motor selected from the plurality of string servo motors controls the motion of its associated individual play pad relative to the individual guide rail;

wherein each string servo motor selected from the plurality of string servo motors provides the motive forces necessary to allow the logic module to properly position each individual play pad relative to the plurality of strings;

wherein each of the plurality of pad solenoids is a solenoid;

wherein each of the plurality of pad solenoids attaches to an individual play pad of an individual play pad guide rail selected from the plurality of play pad guide rails;

wherein each of the plurality of pad solenoids electrically connects to the logic module;

wherein the logic module independently controls each of the plurality of pad solenoids;

wherein each pad solenoid selected from the plurality of pad solenoids controls the motion of its associated individual play pad towards and away from a string selected from the plurality of strings;

wherein each pad solenoid selected from the plurality of pad solenoids provides the motive forces necessary to allow the logic module to press a string selected from the plurality of strings against the fretboard.

17. The music-playing machine according to claim 16 wherein the slap piston is an electromechanical device;

wherein the slap piston is an electrically powered device;

wherein the slap piston electrically connects to the logic module;

wherein the slap piston independently controls each of the logic module;

wherein the slap piston provides the motive forces that simultaneously causes each of the plurality of strings to vibrate;

wherein the pluck module is an electromechanical device;

wherein the pluck module is an electrically powered device;

wherein the pluck module electrically connects to the logic module;

wherein the pluck module independently controls each of the logic module;

wherein the pluck module provides the motive forces that independently plucks each individual string selected from the plurality of strings;

wherein the pluck module allows the control circuit to cause any individual string selected from the plurality of strings to vibrate.

18. The music-playing machine according to claim 17 wherein the fret finder servo motor is a servo motor;

wherein the fret finder servo motor attaches to the fret finder guide rail;

wherein the fret finder servo motor electrically connects to the logic module;

wherein the logic module independently controls each of the fret finder servo motor;

wherein the fret finder servo motor controls the motion the fret finder guide rail relative to the plurality of major axis guide rails;

wherein the fret finder servo motor moves the fret finder image sensor mounted on the fret finder guide rail such that the logic module can identify the location of each of the plurality of frets;

wherein the fret finder image sensor is an image sensor;

wherein the fret finder image sensor mounts on the fret finder guide rail such that the fret finder image sensor captures images of the fretboard as the fret finder guide rail moves relative to the plurality of major axis guide rails;

wherein the fret finder image sensor electrically connects to the logic module.

* * * * *